United States Patent Office 3,334,917
Patented Aug. 8, 1967

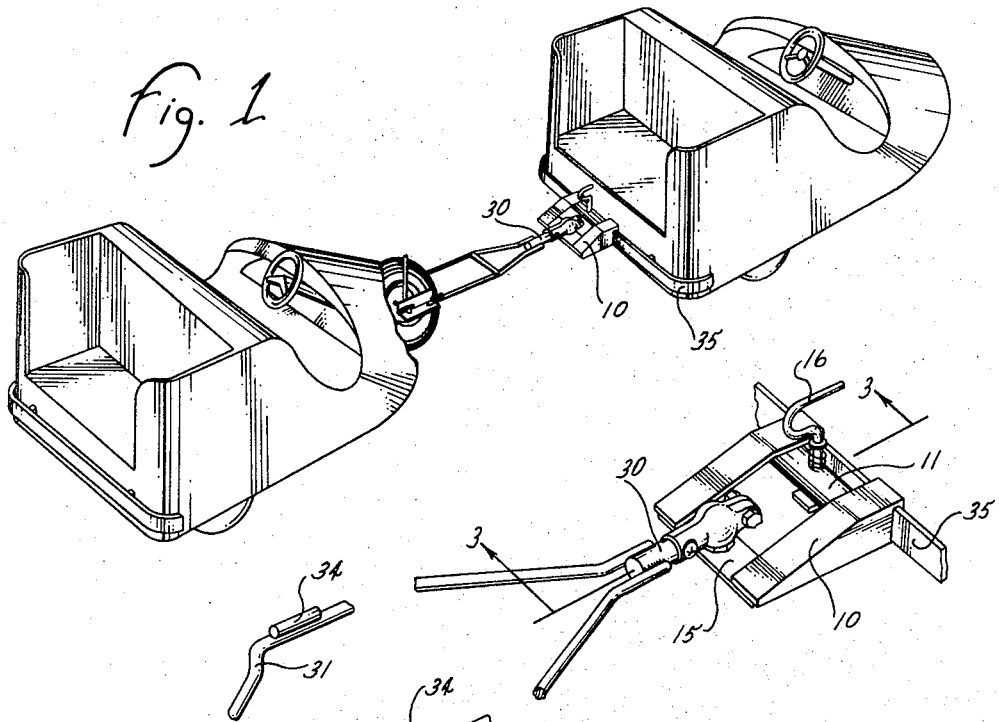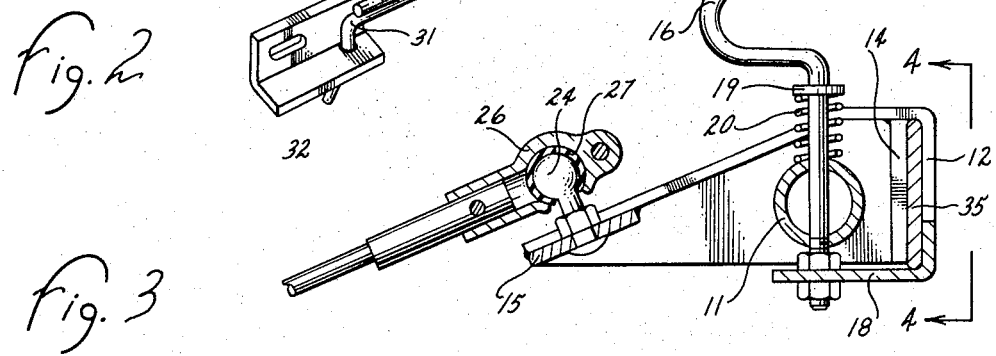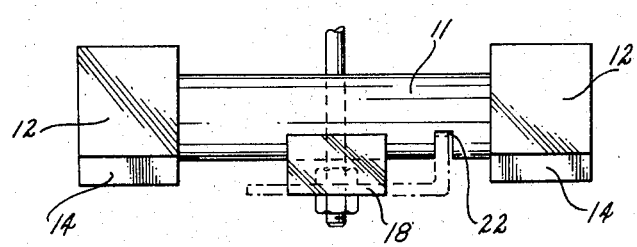

3,334,917
TOW COUPLING
Lawrence E. Smith, 4733 W. Crittenden Lane,
Phoenix, Ariz. 85031
Filed May 14, 1965, Ser. No. 455,732
3 Claims. (Cl. 280—502)

My invention relates to a tow coupling and more particularly to a quickly disconnectable tow coupling requiring no special tools.

Electric or gasoline driven golf carts have gained immense popularity in the United States and elsewhere in recent years. Power driven golf carts are available for private ownership and may also be rented at many golf courses. Occasionally, golf carts run out of gasoline or their batteries become discharged while located at remote portions of the golf course. More frequently, the golf carts are stored at a location remote from where they are to be provided to the golfers. The storage areas also usually include a maintenance shop and, in the case of electric carts, provide recharging means for the cart batteries. Driving the individual carts to and from the storage areas is time-consuming; the time necessary to transport the carts may greatly be reduced by towing several carts in tandem.

Tow coupling previously available have not been suitable for use with golf carts. Most available tow coupling devices are large and difficult to handle and require considerable adaptation to facilitate their use. Further, many of the prior art tow coupling devices required special wrenches or other tools in order to connect and disconnect or transfer the coupling device from one vehicle to another.

It is therefore a principal object of my invention to provide a relatively light-weight tow coupling device which may be quickly connected and disconnected for transfer from one vehicle to another.

It is another object of my invention to provide a tow coupling which may be connected and disconnected from both towing and towed vehicles without the use of special tools.

It is a further object of my invention to provide a tow coupling which is particularly well suited for use with power-driven golf carts.

Other objects and advantages of my invention will become apparent to those skilled in the art in the course of the following specification and claims when taken in view of the accompanying drawings.

Briefly, my invention comprises a tow coupling having a forward member which has at least two downwardly extending claw-like forks which engage over a frame member on a towing vehicle. The forward member has a horizontal body portion which may be in any desired configuration and has a substantially vertically disposed handle extending therethrough. A finger member is secured to the bottom end of the handle below the body portion and engages under and behind the frame member to compliment the action of the downwardly extending forks. Usually, the finger member is disposed between the forks when engaging a frame member.

A spring maintains the finger member in engagement with the bottom of the frame member. A downward twisting pressure on the handle, against the force of the spring, moves the finger-member out of engagement with the frame member and out of cooperation with the forks. The forward member then may be lifted from engagement with the frame member for a quick disconnect. A swivel member is secured to the upper portion of the forward member and engages a tow bar which in turn engages a towed vehicle.

A better understanding of my invention may be obtained in view of the accompanying drawings in which:

FIGURE 1 is a pictorial isometric view illustrating a preferred embodiment of my invention forming a tow coupling between a pair of golf carts;

FIGURE 2 is an isometric view with a portion removed illustrating a preferred embodiment of my tow coupling;

FIGURE 3 is a partial sectional elevational view taken along 3—3 of FIGURE 2; and FIGURE 4 is a partial elevational view taken along 4—4 of FIGURE 3.

Referring to the drawings, a forward member 10 has a body portion 11 and a pair of downwardly extending forks, each fork comprising a forward tine 12 and a rearward tine 14. The body portion 11 is in the form of a cylindrical pipe and is welded to a pair of angular iron side portions, thereby forming the claw-like forward member 10. A horizontal connector plate 15 is secured to the side members by welding. A handle 16 extends substantially vertically through an aperture defined in the body portion 11 and has a finger member 18 secured to its bottom end. A collar 19 welded to the handle 16 holds a pressure spring 20 in engagement with the upper side of the body portion 11.

The finger member 18 has an upwardly extending portion in substantially the same plane as the forward tine 12 when in towing position. Handle 16 is rotatable in said body member 11. The upper portion of the handle is in an easily grippable configuration whereby the handle is used as a carrying means for the entire tow coupling assembly as well as to engage and disengage the finger member 18.

If desired, the body portion 11 may also define a slot 22 in its bottom. For carrying, the handle 16 is depressed and twisted until the upwardly extending portion of the finger member 18 is in alignment with the slot 22. When the handle is released, the spring 20 forces the upwardly extending portion of the finger member 18 into slot 22. Thus engaged in slot 22, finger member 18 prevents twisting of the handle, thereby imparting substantial rigidity thereto for carrying the tow coupling assembly.

Connector plate 15 has a swivel ball 24 mounted thereon and a swivel cap 26 engages over said swivel ball. A suitable bearing 27 may be employed to facilitate the swiveling action of the swivel joint, if desired. A tow rod 30 is secured to the swivel cap 26 and is adapted to engage with a towed vehicle.

In the embodiment shown, tow rod 30 comprises a Y-shaped member with the foot of the Y secured to the swivel cap 26. The upper ends of the Y forming the vehicle-engaging portions of the connecting rod have downwardly extending dog leg portions 31 extending into apertures defined by substantially horizontal flange members 32 secured to the towed vehicle. The flange members 32 are secured to the axle on which the front wheel of the towed vehicle rotates. Arrestor members 34 are welded on the upper Y portions of the tow rod above the dog legs 31. The arrestor members serve to prevent a towed vehicle from riding up on the tow bar in the event of a sudden stop made by the towing vehicle. The apertures defined by flange members 32 are of sufficient diameter to receive the tow rod but will not pass over the thickened portion formed by the arrestor members 34.

In use, dog leg portions 31 of the tow rod are inserted into apertures defined by their respective flange members 32 and the tines 12 and 14 are lowered to engage over frame member 35 secured to the rear of a towing vehicle. Handle 16 is depressed and twisted to bring the upwardly extending portion of finger member 18 substantially into the plane defined by the forward tine 12. When the handle is released, the finger member 18 rises in response to the action of spring 20 and engages the bottom of frame member 35 to provide a secure towing connection. Frame member 35 is illustrated in the form of a substantially flat vertical bumper-like member but may be of any desired configuration. When frame member 35 is of other than the illustrated configuration, tines 12 and 14 and finger members 18 may be suitably adapted.

When not in use, my tow coupling is simply disconnected from both towed and towing vehicles and stored as desired. Conveniently, my tow coupling can be stored in a golf cart so that upon becoming disabled, easy connection may be made with an operative golf cart. Conversely, if another golf cart should be found disabled on the golf course, assistance may be rendered by connecting the golf carts and towing the disabled cart to a service area.

My tow coupling is also suitable for a plurality of golf carts. A single operative golf cart may be connected to one or more golf carts by a plurality of tow couplings in accordance with my invention. When the towed vehicles are adapted as illustrated in the drawings, a single person may tow any number of golf carts depending on the power of the towing cart. Because the flange members 32 are secured to the axle of the front wheel of the towed vehicle, the towed vehicle or vehicles will track with the towing vehicle without further adjustment by the operator or the necessity of a rider or riders to steer the towed vehicles.

While discussion herein has been primarily concerned with the use of my towing coupling with golf carts, it may be readily seen that with suitable strengthening, my tow coupling may be employed with larger vehicles if desired.

Various modifications may be made in my invention without departing from the spirit or scope thereof, and it is to be understood that I limit myself only as defined by the appended claims.

I claim:
1. A tow coupling comprising a claw-like forward member having a plurality of spaced, downwardly extending forks for engagement over a frame member on a towing vehicle, said forward member having a body portion supporting a rotatably and vertically movable, upwardly spring-loaded handle, said handle having a finger member secured thereto below said body portion, said finger member having an upwardly extending portion for engagement under said frame member, and a Y-shaped tow rod, said forward portion and the foot of said Y-shaped tow rod joined by a swivel connection, the upper ends of said Y-shaped tow rod defining downwardly extending dog leg portions for engagement with apertures defined by flanges secured to a towed vehicle.

2. A tow coupling comprising a claw-like forward member having a plurality of spaced, downwardly extending forks for engagement over a frame member on a towing vehicle, said forward member having a body portion supporting a rotatably and vertically movable, upwardly spring-loaded handle, said handle having a finger member secured thereto below said body portion, said finger member having an upwardly extending portion for engagement under said frame member, a Y-shaped tow rod, said forward portion and the foot of said Y-shaped tow rod joined by a swivel connection, the upper ends of said Y-shaped tow rod defining downwardly extending dog leg portions for engagement with apertures defined by flanges secured to a towed vehicle, and arrestor members secured to said Y-shaped tow rod above said dog leg portions.

3. A tow coupling comprising a claw-like forward member having a plurality of spaced, downwardly extending forks for engagement over a frame member on a towing vehicle, said forward member having a body portion supporting a rotatably and vertically movable, upwardly spring-loaded handle, said handle having a finger member secured thereto below said body portion, said finger member having an upwardly extending portion for engagement under said frame member, a connector plate secured to said forward member, a swivel ball mounted on said connector plate, a Y-shaped tow rod, the foot of said Y-shaped tow rod having a swivel cap secured thereto, said swivel cap engaging over said swivel ball on said connector plate, the upper ends of said Y-shaped tow rod defining downwardly extending dog leg portions for engagement with apertures defined by flanges secured to a towed vehicle, and arrestor members secured to said Y-shaped tow rod above said dog leg portions.

References Cited

UNITED STATES PATENTS

| 1,987,943 | 1/1935 | Munson | 24—263 |
| 2,468,669 | 4/1949 | Holmes | 180—14 |
| 2,542,907 | 2/1951 | Dayton et al. | 280—502 |
| 2,589,526 | 3/1952 | Barker | 24—263 X |
| 2,659,146 | 11/1953 | Erickson et al. | 24—263 X |
| 2,773,703 | 12/1956 | Ferguson et al. | 180—14 |
| 2,814,506 | 11/1957 | Croft | 280—502 |
| 2,852,787 | 9/1958 | Wilson | 24—263 |
| 3,013,817 | 12/1961 | Puccio | 280—502 |
| 3,015,423 | 1/1962 | Garraway | 280—502 X |

BENJAMIN HERSH, *Primary Examiner.*

C. C. PARSONS, *Assistant Examiner.*